United States Patent
Dürschinger et al.

(10) Patent No.: US 10,209,041 B2
(45) Date of Patent: Feb. 19, 2019

(54) DETONATOR FOR PASSENGER RESTRAINT SYSTEMS

(71) Applicant: EMS-PATVAG S.R.O., Brankovice (CZ)

(72) Inventors: Günter Dürschinger, Fürth (DE); Elisabeth Dürschinger, Fürth (DE)

(73) Assignee: EMS-PATVAG S.R.O., Brankovice (CZ)

( * ) Notice: Subject to any disclaimer, the term of this patent is extended or adjusted under 35 U.S.C. 154(b) by 0 days.

(21) Appl. No.: 15/527,281

(22) PCT Filed: Nov. 9, 2015

(86) PCT No.: PCT/DE2015/000544
§ 371 (c)(1),
(2) Date: May 16, 2017

(87) PCT Pub. No.: WO2016/078634
PCT Pub. Date: May 26, 2016

(65) Prior Publication Data
US 2017/0363396 A1   Dec. 21, 2017

(30) Foreign Application Priority Data

Nov. 17, 2014  (DE) .......... 10 2014 016 923
Nov. 3, 2015   (DE) .......... 10 2015 014 124

(51) Int. Cl.
*F42B 3/103*   (2006.01)
*B60R 21/26*   (2011.01)
(Continued)

(52) U.S. Cl.
CPC ............. *F42B 3/103* (2013.01); *B60R 21/26* (2013.01); *B60R 21/264* (2013.01); *F42B 3/125* (2013.01);
(Continued)

(58) Field of Classification Search
CPC .......... F42B 3/103; F42B 3/195; F42B 3/125; B60R 21/264
(Continued)

(56) References Cited

U.S. PATENT DOCUMENTS 6,096,997 A * 8/2000 Shirk .................... G01N 25/72
102/202.7
6,601,514 B1  8/2003 Bretfeld et al.
(Continued)

FOREIGN PATENT DOCUMENTS

AT    513505 B1   5/2014
CH    455691 A    7/1968
(Continued)

OTHER PUBLICATIONS

European Patent Office, International Search Report in International Application No. PCT/DE2015/000544 (dated May 9, 2016).
(Continued)

*Primary Examiner* — Reginald S Tillman, Jr.
(74) *Attorney, Agent, or Firm* — Leydig, Voit & Mayer, Ltd.

(57) ABSTRACT

The invention relates to an ignition capsule for a gas generator of an occupant restraint system in a motor vehicle, in particular for the gas generator of an inflatable airbag, said ignition capsule comprising means for supporting extremely high pressures during ignition.

11 Claims, 4 Drawing Sheets

Figure 1:
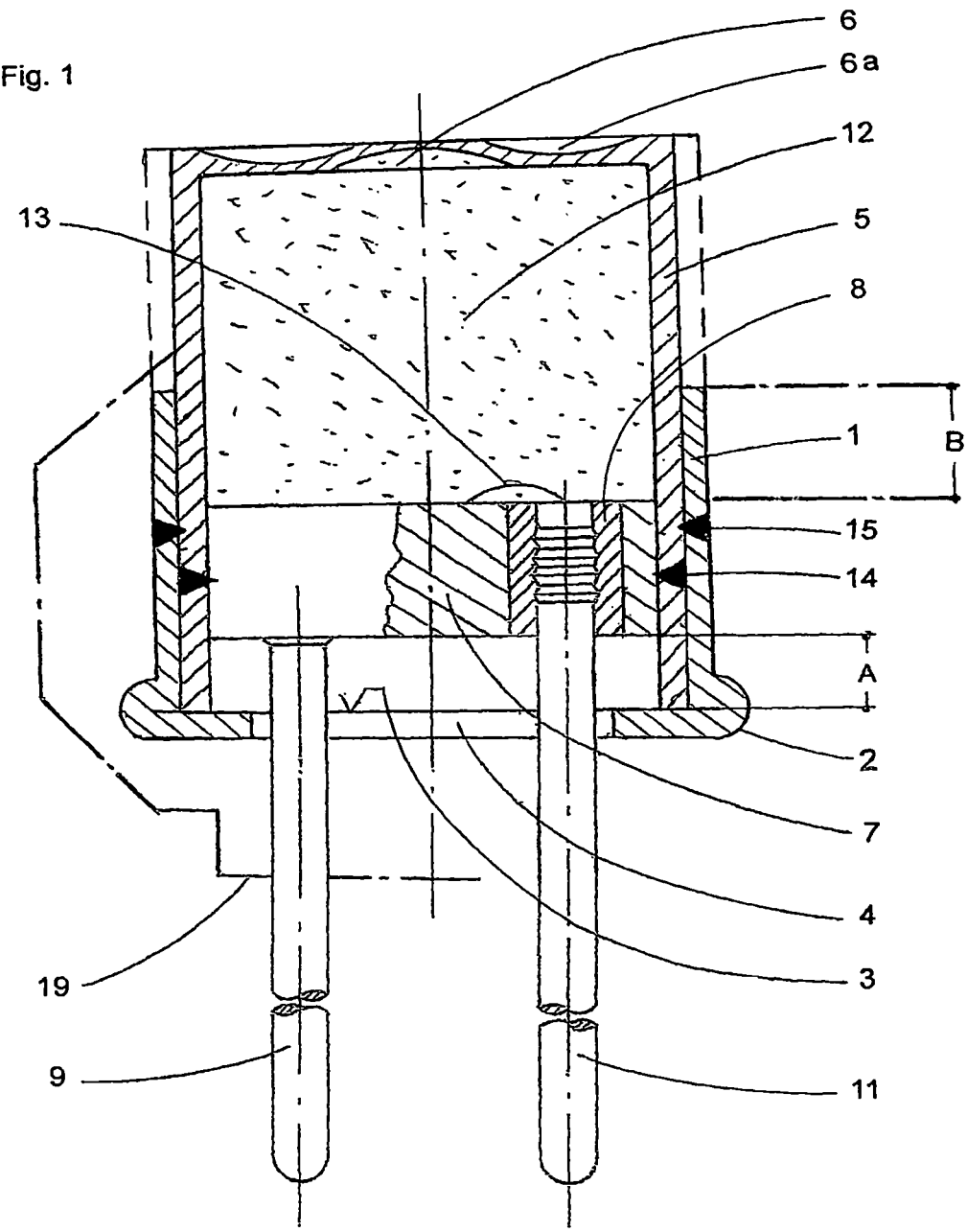

(51) Int. Cl.
    *F42B 3/12*     (2006.01)
    *F42B 3/195*     (2006.01)
    *B60R 21/264*     (2006.01)
    *F42B 3/198*     (2006.01)

(52) U.S. Cl.
    CPC .............. *F42B 3/127* (2013.01); *F42B 3/195* (2013.01); *B60R 2021/26029* (2013.01); *B60R 2021/26076* (2013.01); *F42B 3/198* (2013.01)

(58) Field of Classification Search
    USPC ............. 102/202.14, 202.9, 202.5, 200, 531; 280/740
    See application file for complete search history.

(56) References Cited

U.S. PATENT DOCUMENTS

| | | | |
|---|---|---|---|
| 8,205,554 | B2 | 6/2012 | Fink |
| 2004/0112239 | A1 | 6/2004 | Parks et al. |
| 2004/0216631 | A1 | 11/2004 | Fink et al. |
| 2005/0051435 | A1 | 3/2005 | Forster et al. |
| 2005/0115434 | A1* | 6/2005 | Avetisian ................ F42B 3/125 102/202.7 |
| 2006/0222881 | A1 | 10/2006 | Fink et al. |
| 2009/0044715 | A1 | 2/2009 | Hartl et al. |
| 2010/0064923 | A1 | 3/2010 | Fink |

FOREIGN PATENT DOCUMENTS

| | | |
|---|---|---|
| DE | 015 78 099 A1 | 4/1971 |
| DE | 034 47 088 A1 | 7/1986 |
| DE | 044 29 175 A1 | 3/1995 |
| DE | 198 20 757 A1 | 11/1999 |
| DE | 198 36 278 A1 | 3/2000 |
| DE | 198 36 280 C1 | 5/2000 |
| DE | 199 61 134 C1 | 2/2001 |
| DE | 103 26 253 B3 | 11/2004 |
| DE | 10 2006 056 077 A1 | 5/2008 |
| DE | 10 2007 001 640 A1 | 7/2008 |
| DE | 10 2007 031 690 B4 | 6/2009 |
| EP | 0 705 740 B1 | 11/2001 |
| EP | 1 455 160 A1 | 9/2004 |
| EP | 1 541 958 A1 | 6/2005 |
| EP | 2 157 399 A1 | 2/2010 |
| EP | 1 716 385 B1 | 9/2010 |
| EP | 2 351 980 A1 | 8/2011 |
| FR | 2984253 A1 | 6/2013 |
| GB | 1176247 A | 1/1970 |
| WO | WO 2013/118405 A1 | 8/2013 |

OTHER PUBLICATIONS

European Patent Office, Written Opinion in International Application No. PCT/DE2015/000544 (dated May 9, 2016).
International Bureau of WIPO, International Preliminary Report on Patentability (Chapter I) in International Application No. PCT/DE2015/000544 (dated May 9, 2016).

* cited by examiner

DETONATOR FOR PASSENGER RESTRAINT SYSTEMS

CROSS-REFERENCE TO RELATED APPLICATIONS

This patent application is the U.S. national phase of International Application No. PCT/DE2015/000544, filed on Nov. 9, 2015, which claims the benefit of German Patent Application No. 10 2014 016 923.5, filed Nov. 17, 2014 and German Patent Application No. 10 2015 014 124.4, filed Nov. 3, 2015, the disclosures of which are incorporated herein by reference in their entireties for all purposes.

The invention relates to a detonator for the gas generator of a passenger restraint system in an automotive vehicle.

Inflatable airbags and the seat-belt tensioner belong to the most frequently used passenger restraint systems. Both restraint systems require a gas generator, the propellant charge of which is made to explode by a detonator in the event of an automotive vehicle collision. The consequently released quantity of gas inflates the airbag or causes the turbine wheel of the belt tensioner to rotate.

Detonators for airbag gas generators are known according to the state of the art.

In DE 10 2007 001 640 A1, DE 10 2006 056 077 A1, DE 199 61 134 C1, DE 198 36 280 C1, DE 44 29 175 A1, DE 198 36 278 A1, DE 103 26 253 B3, DE 10 2007 031 690 B4, EP 1 541 958 A1, EP 0 705 740 B1, EP 1 716 385 B1, EP 2 351 980 A1, detonators are described, the gas-sealed connection between the base part and the housing with the detonating agent chamber being effected by means of a circumferential weld seam or a form-fit.

A serious disadvantage resides in the fact that, when using an aggressive detonating agent and the extremely high internal pressure in the detonating agent chamber, which is produced during the detonation, the danger exists that deformation of the wall or cracks can occur (bonfire test).

Constructional developments for preventing a relative movement of the glass plug or for preventing emergence of the contact pin out of the glass plug during the detonating process are described in detail in EP 1 455 160 B1.

In AT 513505 B1, features are disclosed, the expulsion force of the glass material out of the basic body and the pin extraction force being increased with considerable, sudden, short-term loading of the igniter.

From DE 198 20 757 A1, circumferential annular depressions in the sealing region of the contact pins are already known.

From U.S. 2005/0 115 434 A1, a detonator 56 with a basic body 44 and a sleeve 36 is known, the sleeve 36 being connected to the basic body 44 in a form-fit by means of a conical taper 27. A base fold with a punched-out base and limit stop is not present.

In FR 2 984 253 A1, a detonator is disclosed, the detonating element being embedded in a plastic material base. A weld seam between the plastic material base 44 and the single-walled housing 2 is not possible. The fire during the detonation process impinges directly on the plastic material. Particular features for avoiding deformation of the housing wall during the detonation process, for example a reinforcement, are not detectable.

In WO 2013/118 405 A1, a detonator is disclosed, the detonator 12 being moulded in the synthetic resin to the basic body 13 and the contact pins 14. The form-fit connection to the single-walled housing 41 is effected by means of mechanical long-term tensioning force by widening in the conical region 45 of d2 on D1 during pressing-in. A reinforcement or base fold with limit stop is not provided.

The object underlying the invention is to indicate a detonator for the gas generator of a passenger restraint system, in which the housing is reinforced in such a way as to absorb an extremely high internal pressure during detonation without difficulty.

The object is achieved by the features of claim 1.

The invention starts from the concept of producing a sleeve with a base fold and limit stop, in particular in a thermoforming process.

Economical production of sleeves with a base fold is described in detail in the Swiss patent specification number 455 691.

Such sleeves with a base fold are used reliably in munitions manufacture, in particular as rimfire cartridges for Olympic rapid-fire pistols for trouble-free functioning and avoidance of sleeve jamming in the cartridge chamber or cracks during the detonation process (German unexamined application 1 578 099).

From this almost 50-year positive experience, the sleeve with a base fold can be transferred to the airbag detonator without reservations since the base fold acts like a reinforcement during the detonation process and consequently the most important UN test for airbags, the external fire test UN 6 (c), also termed "bonfire test", can be fulfilled.

The invention is subsequently explained in more detail with reference to embodiments:

FIG. 1 shows schematically a section through the detonator according to the invention. The detonator has a sleeve 1 with a base fold 2, the base of the sleeve 1 having at least one opening which is circular 4, 4a or is configured as an oblong hole 4b, with a sleeve 5 which is closed on one side with predetermined breaking points 6, 6a, with a basic body 7 with a welded-on electrical contact pin 9 and an insulated electrical contact pin 11, 11a which is imbedded in insulation material 8 and is connected rigidly to the basic body 7 by means of a glow wire 13, the assembled basic body 7 being inserted, after filling the sleeve 5 with detonating agent 12, into the sleeve 5 at a spacing A, in a gas-sealed manner with a circumferential weld seam 14, the sleeve 5 being inserted into the sleeve 1 against a limit stop 3, having a circumferential weld seam 15 with an overlap B in the detonation region.

Figure 2:
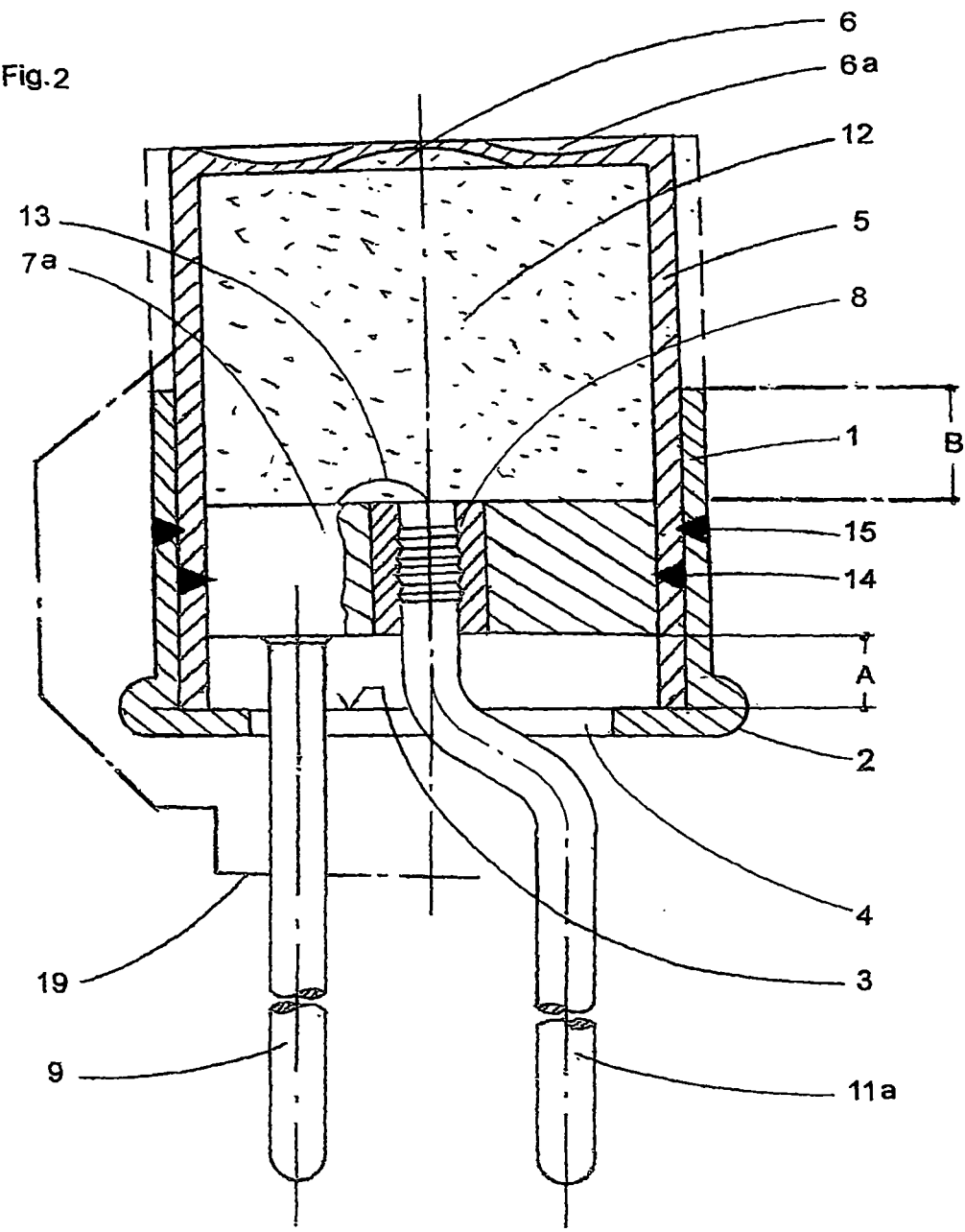

FIG. 2 shows schematically in section an embodiment, the insulated cranked contact pin 11a, which is embedded in the insulation material 8, being fitted in the centre of the basic body 7a, with uniform wall thickness of the basic body 7a.

Figure 3:
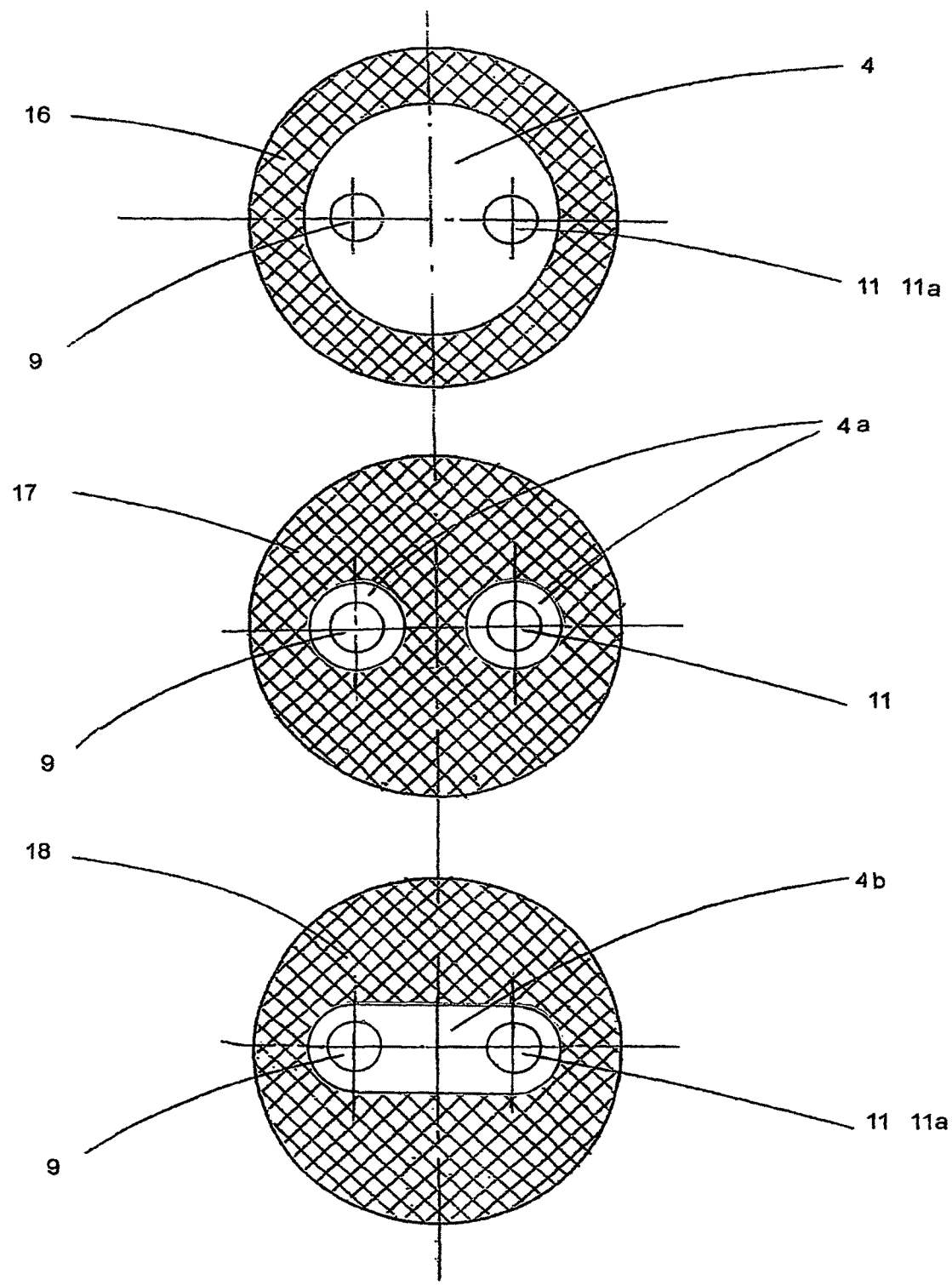

FIG. 3 shows schematically in section the detonator with the 3 possibilities of different openings in the base 4, 4a, 4b and the contact pins 9 and 11, 11a and also the support surfaces 16, 17, 18.

Figure 4:
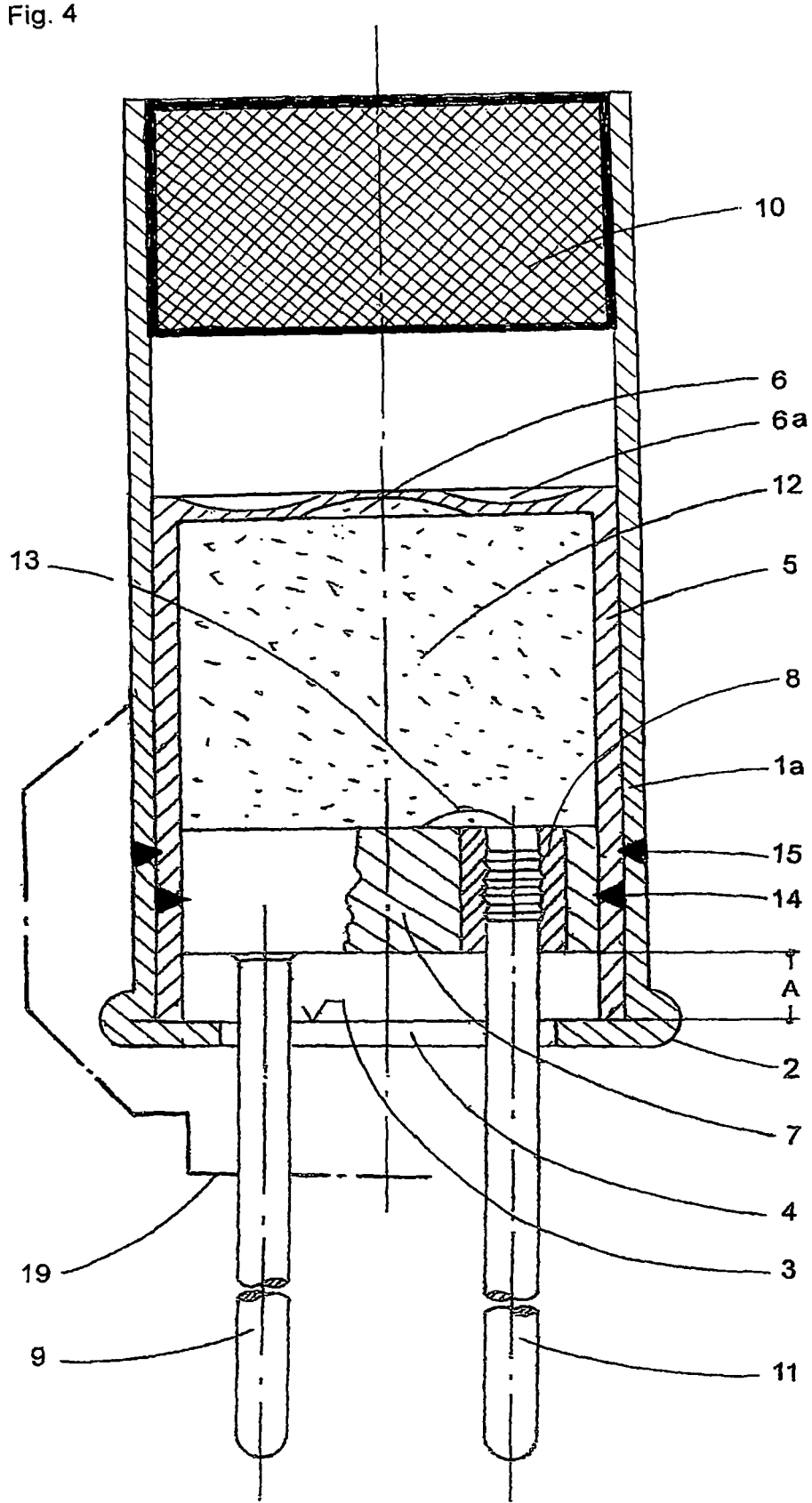

FIG. 4 shows schematically in section the detonator with extended sleeve 1a with a booster charge 10.

The invention claimed is:

1. A detonator for the gas generator of a passenger restraint system in an automotive vehicle, with a first sleeve produced in a thermoforming process with a form-fit base fold, a base of the first sleeve having at least one opening which is circular or is configured as an oblong hole, with a second sleeve which is closed on one side with predetermined breaking points, with a basic body with a welded-on electrical contact pin and an insulated electrical contact pin which is embedded in insulation material and is connected rigidly to the basic body by means of a glow wire, the basic body being inserted, after filling the second sleeve with detonating agent, into the second sleeve at a spacing, in a gas-sealed manner with a circumferential weld seam, the second sleeve being inserted into the first sleeve against a limit stop of the first sleeve, having a circumferential weld seam with an overlap at least in a detonation region.

2. The detonator according to claim 1, wherein the contact pin is cranked and fitted in the centre of the basic body.

3. The detonator according to claim 1, wherein the insulating material is glass, ceramic or plastic material.

4. The detonator according to claim 1, wherein the detonating agent is dry, liquid or flowable.

5. The detonator according to claim 1, wherein the spacing is filled with plastic material during injection moulding of the detonator, as buffer between the basic body and the limit stop.

6. The detonator according to claim 1, wherein the spacing is 0-3 mm.

7. The detonator according to claim 1, wherein the first sleeve is configured, in extended configuration, with a booster charge.

8. The detonator according to claim 1, wherein the first sleeve is surrounded by an insulation cap made of plastic material.

9. The detonator according to claim 1, wherein the first sleeve is configured with a base fold.

10. The detonator according to claim 1, wherein the second sleeve has a planar face, wherein the predetermined breaking points are configured on the inside of the planar face of the second sleeve by a chased depression in the centre and by notches disposed in a star-shape on the outside of the planar face of the second sleeve.

11. The detonator according to claim 1, wherein the basic body is inserted alternatively into the first sleeve with base fold against a limit stop, with a circumferential weld seam, the first sleeve being sealed hermetically after filling with detonating agent by the second sleeve, which is closed on one side and has predetermined breaking points, with a circumferential weld seam.

* * * * *